(No Model.)

J. J. DAVENPORT.
WATER COOLER AND FILTER.

No. 535,942.  Patented Mar. 19, 1895.

Witnesses:
T. Leonard Haney
Melville Church

Inventor,
Joseph Jackson Davenport
by W. M. Fairfax
atty.

UNITED STATES PATENT OFFICE.

JOSEPH JACKSON DAVENPORT, OF KANSAS CITY, MISSOURI.

WATER COOLER AND FILTER.

SPECIFICATION forming part of Letters Patent No. 535,942, dated March 19, 1895.

Application filed August 4, 1893. Serial No. 482,404. (No model.)

*To all whom it may concern:*

Be it known that I, JOSEPH JACKSON DAVENPORT, a citizen of the United States, residing at Kansas City, in the county of Jackson and State of Missouri, have invented certain new and useful Improvements in a Combined Water Cooler and Filter; and I do declare the following to be a full, clear, and exact description of the invention, such as will enable others skilled in the art to which it appertains to make and use the same, reference being had to the accompanying drawings, and to the letters of reference marked thereon, which form a part of this specification.

The objects of my improvement are to provide, first, a portable water cooler and filter combined, in which the impure ice, as well as water, can be put into the same compartment, and filtered into a separate and ventilated storage chamber in the same vessel, where its coldness will be maintained by the iced water in process of filtration, and, second, to provide a water cooler and filter combined, in which a greater quantity of unfiltered and filtered water can be stored, in which the filtration will be faster, the filtering material kept clean more easily, and smaller and narrower pieces of natural porous stone be utilized for filtering and preserved longer, than in those now designed, used or patented. I obtain these results, by the combination of the parts illustrated in the accompanying drawings, in which—

Figure 1:
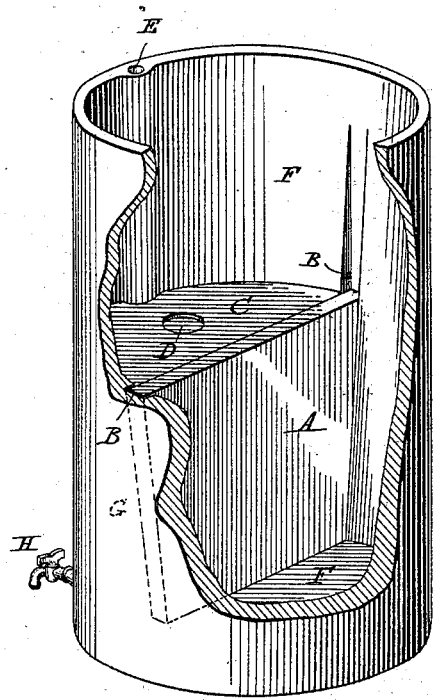
Figure 2:
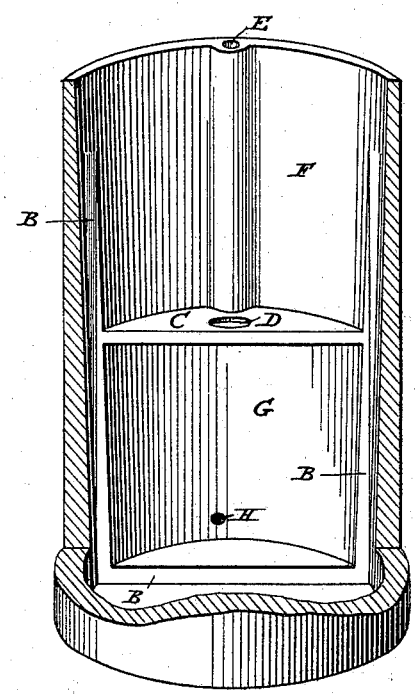

Figure 1 is a perspective view of the device. Fig. 2 is a perspective view of the same with the filtering material removed.

A represents the flat filtering stone or material.

B represents the grooves holding the stone in position.

C represents the shelf for holding ice.

D represents a sealed opening in shelf C.

E represents the air vent for chamber G.

F represents the storage compartment for unfiltered water.

G represents the ventilated storage chamber for filtered water.

H represents the faucet through which water is drawn.

The ice is placed upon shelf C, which is molded, cast or built on the side of the vessel, and projects into the middle or nearly so, about half way from the top, and is provided with a sealed opening D, opening into compartment G, so that the latter can be cleaned, or faucet H replaced or repaired. The impure water is poured in upon the ice, until compartment F is full, when the iced water filters through the flat filtering stone or material A, placed in the lower part of the vessel, into the closed and ventilated storage chamber G, from which it is drawn through faucet H. Thus by this simple, cheap and durable contrivance, the melted ice, which most always contains unwholesome matter, and the impure water, are filtered and stored in a separate compartment of the same vessel, where the coldness is maintained by the iced water in process of filtration in chamber F, that surrounds and covers storage chamber G, upon the top and side.

I know there are combined coolers and filters, in which both the ice and water can be placed in one compartment at the same time, and the iced water filtered into a separate chamber, in a separate vessel placed beneath the filter, but it is not done, because no means have been devised for keeping the filtered water cold after it is there, except mixing it with ice again, which vitiates it anew, or placing a covered vessel containing ice, inside the storage chamber, which also has its disadvantages, or by packing it on the outside and between the walls.

Filters in which hydrant or other artificial pressure is employed, are packed in ice, and the water filtered and cooled only as fast as it is required for drinking. Those without hydrants or similar pressure, cannot cool and filter by the latter process, and by the former usually waste the melted ice. The combination I have devised for keeping the water cold, also utilizes the iced water, with which it is cooled, for drinking purposes, and avoids the danger of the unfiltered contents of an ice holder overflowing, when the ice is replenished, or being spilled, by careless handling when taken out of the chamber to be emptied, into the pure filtered water usually surrounding it. The chamber G thus separated and sealed, so as to prevent its contents being disturbed or contaminated, is devoted exclusively to the storing of pure water, and is ventilated by the connection with air vent E, as will be seen in Figs. 1 and 2, whereby its purity is maintained.

By my improvement and combination a larger quantity of both filtered and unfiltered water can be stored, first, because space in cooling chamber G is not taken up by another vessel placed inside of it for holding ice, and, second, because the cooler and filter is in one piece, whereas those now in use or patented are composed of two distinct and separate parts, one of which must be kept empty if the other is full. Otherwise the contents would all run out through the division in the center. Again, if the ice be placed in the bottom portion, in such a vessel as I have mentioned, the upper or filtering part would have to be empty before the ice could be replenished, unless wetting everything upon which it was placed, was unobjectionable. The flat filtering stone or material A, being placed in a vertical position, as shown in Fig. 1, its pores cannot become clogged by the precipitation of sediment upon its surface, as is the case in those filters where it is horizontal. As the pure water is drawn from chamber G through faucet H, that in chamber F will fall, and passing over the face of filtering material A, carry any thing upon its surface, down to the bottom of the vessel, thus keeping it clean more easily, and in a manner that will preserve it indefinitely, where natural porous stone or other soft substance is used. When the stone or filtering material is placed horizontally, it is necessary to brush it daily, and sometimes oftener, with a stiff brush, or rub it with a cloth, either wearing it away, or stopping the pores and destroying its efficiency. There being no opening or division around the exterior of my device, as in those composed of separate pieces, I have shown that a greater quantity of water can be stored without the danger of overflow. Consequently I get more natural pressure upon my filtering surface A, as the space devoted to the impure ice and water in process of filtration in chamber F, is much greater than that devoted to such purpose in other combined coolers and filters. Thus together with keeping the surface of my filtering material clean all the time, which cannot be done when it is placed horizontally, or where the agitation by artificial pressure prevents the natural settling of the water, filtration is greatly accelerated.

The vessel is provided with grooves "B" as will be seen in Figs. 1 and 2, whereby the filtering stone or material is held in position, and in order that its cylindrical form may be maintained upon the exterior surface, it is made thicker near the bottom, than at the top, as will be seen in Figs. 1 and 2. I do not confine myself to this particular construction however, as the cooler may be made any shape to suit individual fancy, and the filtering stone or material, may be grooved, and ridges left upon the inside of the vessel, to enter said groove, or it may be made to set in a beveled opening cast, molded or built in its center, near the bottom.

By securing the filtering material A, in position with grooves B, as shown in Figs. 1 and 2, and placing it in a vertical position in the vessel, I am enabled to use narrow pieces of natural porous stone that cannot be used for such purposes horizontally, as a tight joint can be made with cement or other material, when placed one above the other in the former position, when it cannot if placed alongside of one another in the latter. The weight of the stone placed vertically in grooves B, as shown in Figs. 1 and 2, holds the cement firm, so that the action of the water does not affect it, whereas placed horizontally, the downward pressure of the water would cause it to fall to the bottom of the vessel, as the absorptive quality of the stone is so great, that a permanent and perfect bond cannot be made between two pieces. Large and perfect pieces of natural porous stone cannot always be readily obtained. When such is the case I can by my combination and improvement, build any size cooler and filter desired.

In the above description I have as is seen used the words "vertically arranged" in reference to the filtering material, or body, in contradistinction to the words horizontally arranged. Therefore I regard as within the scope of my invention all arrangements in which the filtering body or material is placed at such an angle to a horizontal position that the sediment is enabled to be carried off its surface by gravity and the action of the water.

Having fully described my improvement and device, what I claim, and desire to secure by Letters Patent, is—

1. A combined water cooler and filter having separate storage compartments, in one of which is placed the ice, and unfiltered water, and in the other is gathered the cooled, filtered water, and a vertically arranged mass of filtering material which forms in whole or in part the separation between the compartments.

2. A combined cooler and filter having separate storage compartments, in one of which is placed the ice and unfiltered water, and in the other is gathered the cooled, filtered water, and a vertically arranged mass of filtering material which forms in whole or in part the separation between the compartments, and an ice supporting shelf in the first of said compartments to hold the ice.

3. A combined cooler and filter having separate storage compartments in one of which is placed the ice and unfiltered water, and in the other is gathered the cooled, filtered water, and a vertically arranged slab of filtering stone forming in whole or in part the separation between the compartments, and having a smooth, vertical side facing the compartment containing the unfiltered water, whereby sediment collecting on the side of the stone readily falls therefrom to the bottom of the vessel.

In testimony whereof I affix my signature in presence of two witnesses.

JOSEPH JACKSON DAVENPORT.

Witnesses:
 JAMES G. YOUNG,
 BESSIE E. YOUNG.